United States Patent
Tsunori et al.

(10) Patent No.: US 7,732,532 B2
(45) Date of Patent: Jun. 8, 2010

(54) MULTI-STAGE PROPYLENE POLYMER, PROCESS FOR PRODUCING THE SAME, AND PROPYLENE RESIN COMPOSITION

(75) Inventors: Ryoichi Tsunori, Ichihara (JP); Yasuhiko Otsuki, Ichihara (JP); Tsutomu Onodera, Ichihara (JP); Shohei Ikeda, Ichihara (JP); Masayuki Shinohara, Ichihara (JP)

(73) Assignee: Prime Polymer Co., Ltd., Tokyo (JP)

( * ) Notice: Subject to any disclaimer, the term of this patent is extended or adjusted under 35 U.S.C. 154(b) by 660 days.

(21) Appl. No.: 10/594,768

(22) PCT Filed: Mar. 15, 2005

(86) PCT No.: PCT/JP2005/004487

§ 371 (c)(1),
(2), (4) Date: Jan. 25, 2007

(87) PCT Pub. No.: WO2005/097842

PCT Pub. Date: Oct. 20, 2005

(65) Prior Publication Data
US 2007/0208138 A1    Sep. 6, 2007

(30) Foreign Application Priority Data
Mar. 31, 2004  (JP)  ............... 2004-103371

(51) Int. Cl.
*C08L 23/10* (2006.01)
(52) U.S. Cl. ........................ 525/240; 525/243; 525/245; 525/247
(58) Field of Classification Search .................. 525/191, 525/240, 243, 245, 247
See application file for complete search history.

(56) References Cited

U.S. PATENT DOCUMENTS 6,251,997 B1 * 6/2001 Imai et al. .................... 525/191
6,306,973 B1 * 10/2001 Takaoka et al. .............. 525/240

FOREIGN PATENT DOCUMENTS

| | | |
|---|---|---|
| EP | 1 026 184 A1 | 8/2000 |
| EP | 1 026 198 A1 | 8/2000 |
| JP | 56 166211 | 12/1981 |
| JP | 59 172507 | 9/1984 |
| JP | 88 00212 | 1/1988 |
| JP | 5 239149 | 9/1993 |
| JP | 6 80729 | 3/1994 |
| JP | 7 138323 | 5/1995 |
| JP | 10 279632 | 10/1998 |
| JP | 99 07752 | 2/1999 |
| JP | 11 181178 | 7/1999 |
| JP | 11 228629 | 8/1999 |
| JP | 11 315178 | 11/1999 |
| JP | 2000 143866 | 5/2000 |
| JP | 2000 226478 | 8/2000 |
| JP | 2000 309670 | 11/2000 |
| JP | 2000 336198 | 12/2000 |
| JP | 2001 48916 | 2/2001 |
| JP | 2001 55413 | 2/2001 |
| JP | 2001 247616 | 9/2001 |
| JP | 2001 348452 | 12/2001 |
| JP | 2002 12717 | 1/2002 |
| JP | 2002 80656 | 3/2002 |
| JP | 2002 509575 | 3/2002 |
| JP | 2002 309049 | 10/2002 |
| JP | 2002 363355 | 12/2002 |
| JP | 2002 542360 | 12/2002 |
| WO | WO 98/45368 | * 10/1998 |

* cited by examiner

*Primary Examiner*—Ling-Siu Choi
(74) *Attorney, Agent, or Firm*—Oblon, Spivak, McClelland, Maier & Neustadt, L.L.P.

(57) ABSTRACT

A multistage propylene-based polymer including the following components (A) and (B): (A) 5 to 20 wt % of a propylene homopolymer component or a copolymer component of propylene and an α-olefin with 2 to 8 carbon atoms having an intrinsic viscosity [η] of more than 10 dL/g in tetralin at 135° C.; and (B) 80 to 95 wt % of a propylene homopolymer component or a copolymer component of propylene and an α-olefin with 2 to 8 carbon atoms having an intrinsic viscosity [η] of 0.5 to 3.0 dL/g in tetralin at 135° C.

20 Claims, No Drawings

MULTI-STAGE PROPYLENE POLYMER, PROCESS FOR PRODUCING THE SAME, AND PROPYLENE RESIN COMPOSITION

TECHNICAL FIELD

The present invention relates to a multistage propylene-based polymer, a method for producing the same, and a propylene-based resin composition.

BACKGROUND ART

Conventionally, increasing melt tensile strength of a resin has been thought to be effective for improving foam-moldability. Therefore, polypropylene resins have been designed so as to increase strain hardening capability by providing a branched molecular structure to cause the molecules to be entangled and by causing high molecular weight components to be included in the resins.

Although providing strain hardening capability is effective for improving foam-moldability, conventional methods of providing strain hardening capability have following problems. First, as the method for producing a propylene-based resin with a branched structure, a method of copolymerizing a non-conjugated diene and propylene (Patent Document 1) and a method of irradiating the propylene-based polymer with electron beams (Patent Documents 2 to 6) are commonly known.

However, it is difficult to control the branched structure in the former method, resulting in a problem of a poor outward surface appearance of a foam-molded product due to gel production. The latter method requires installation of special equipment in the propylene polymer manufacturing plant, which results in an increase in the production cost. In addition, product properties may unduly change due to changes in the polymer structure during recycling in these methods.

Next, as the method for providing high molecular weight components, a method of blending components having greatly differing molecular weights (Patent Document 7) and a multistage polymerization method using a continuous polymerization unit can be given. The former method requires secondary processing to ensure sufficient dispersion of high molecular weight components and to maintain an excellent outward surface appearance of foam-molded products. The latter method includes a method of providing the high molecular weight components in a preliminary polymerization stage (Patent Documents 8 to 11) and a method of providing the high molecular weight components in the polymerization stage. In the method of providing the high molecular weight components in a preliminary polymerization stage, not only the amount of high molecular weight components that can be added is limited, but the increase in melt tension is also limited.

On the other hand, the method for providing a high molecular weight propylene-based polymer by multistage polymerization has been used as a common method, because the method does not require special manufacturing equipment and can be operated with easy quality control. A method for expanding the molecular weight distribution by an organo-silicon compound using a catalyst carrying $MgCl_2$ in the multistage polymerization has been proposed (Patent Documents 12 to 14). However, the effect of improving melt tension was insufficient.

A method for continuously providing a multistage propylene-based polymer in two or more polymerization vessels using a catalyst carrying $MgCl_2$, while controlling the hydrogen concentration in the system has been proposed (Patent Documents 15 to 19). However, the method is impractical, because the polymerization temperature must be extremely low in order to provide an ultrahigh molecular weight propylene-based polymer having an intrinsic viscosity [η] of 10 dL/g or more in tetralin at 135° C. In the case of providing a polymer having an intrinsic viscosity [η] of less than 10 dL/g, the effect of improving melt tension was insufficient.

In addition, when a foamed sheet is produced from a propylene-based polymer or a composition of the propylene-based polymer, the product must have an excellent outward surface appearance, particularly controlled corrugated marking properties, which requires controlled viscoelastic characteristics of the propylene-based polymer composition.

[Patent document 1] Japanese Patent Application Laid-open No. 06-080729

[Patent Document 2] Japanese translation of PCT application No. 2002-542360

[Patent Document 3] Japanese Patent Application Laid-open No. 2000-309670

[Patent Document 4] Japanese Patent Application Laid-open No. 2000-336198

[Patent Document 5] Japanese Patent Application Laid-open No. 2002-012717

[Patent Document 6] Japanese Patent Application Laid-open No. 2002-363355

[Patent Document 7] Japanese Patent Application Laid-open No. 2002-309049

[Patent Document 8] Japanese translation of PCT application No. 2002-509575

[Patent document 9] Japanese Patent Application Laid-open No. 10-279632

[Patent Document 10] Japanese Patent Application Laid-open No. 11-315178

[Patent Document 11] Japanese Patent Application Laid-open No. 2000-143866

[Patent Document 12] Japanese Patent Application Laid-open No. 2001-247616

[Patent Document 13] Japanese Patent Application Laid-open No. 2001-048916

[Patent Document 14] Japanese Patent Application Laid-open No. 2001-055413

[Patent Document 15] Japanese Patent Application Laid-open No. 59-172507

[Patent Document 16] Japanese Patent Application Laid-open No. 05-239149

[Patent Document 17] Japanese Patent Application Laid-open No. 07-138323

[Patent Document 18] Japanese Patent Application Laid-open No. 11-228629

[Patent Document 19] Japanese Patent Application Laid-open No. 2000-226478

The invention has been achieved in view of the above-described problems. An object of the invention is to provide a multistage propylene-based polymer possessing high melt tension and outstanding viscoelastic characteristics, a method for producing the same, and a propylene-based resin composition.

DISCLOSURE OF THE INVENTION

As a result of extensive research in order to achieve the above object, the present inventors have found that a multistage linear propylene-based polymer, of which the melt tension has been promoted and the viscoelastic characteristics have been optimized by adjusting the molecular weight and molecular weight distribution without providing a branched structure, exhibits good foam-moldability and provides foamed products having an excellent outward surface appearance and that drawing characteristics during foam-molding and foam stability after drawing can be improved by adjusting the molecular weight distribution and by controlling contribution of a specific relaxation-time region of the multistage linear propylene-based polymer. These findings have led to completion of the invention. The inventors have further found that the above multistage propylene-based polymer can be manufactured by providing an ultrahigh molecular weight propylene-based polymer component in a first stage of the polymerization process comprising two or more stages using a titanium trichloride catalyst, leading to completion of the invention.

According to the invention, the following multistage propylene-based polymer and the like are provided.

1. A multistage propylene-based polymer comprising the following components (A) and (B): (A) 5 to 20 wt % of a propylene homopolymer component or a copolymer component of propylene and an α-olefin with 2 to 8 carbon atoms having an intrinsic viscosity [η] of more than 10 dL/g in tetralin at 135° C.; and (B) 80 to 95 wt % of a propylene homopolymer component or a copolymer component of propylene and an α-olefin with 2 to 8 carbon atoms having an intrinsic viscosity [η] of 0.5 to 3.0 dL/g in tetralin at 135° C.

2. The multistage propylene-based polymer according to 1, comprising 8 to 18 wt % of the (A) component and 82 to 92 wt % of the (B) component.

3. The multistage propylene-based polymer according to 1 or 2 of which the melt flow rate is 100 g/10 min or less at 230° C., the melt flow rate (MFR) at 230° C. and the melt tension (MT) at 230° C. thereof satisfying the following relationship (1).

$$\log(MT) > -1.33 \log(MFR) + 1.2 \quad (1)$$

4. The multistage propylene-based polymer according to any one of 1 to 3, wherein the ratio of the storage modulus G' (10) at an angular frequency of 10 rad/s to the storage modulus G' (1) at an angular frequency of 1 rad/s, G' (10)/G' (1), is 2 or more; and the ratio of the storage modulus G' (0.1) at an angular frequency of 0.1 rad/s to the storage modulus G' (0.01) at an angular frequency of 0.01 rad/s, G' (0.1)/G' (0.01), is 6 or less.

5. A method for producing the multistage propylene-based polymer of any one of 1 to 4, comprising: polymerizing propylene, or copolymerizing propylene and an α-olefin with 2 to 8 carbon atoms by using an olefin polymerization catalyst comprising the following components (a) and (b), or (a), (b), and (c) in 2 or more polymerization stages:

(a) a solid catalyst component obtainable by treating titanium trichloride with an ether compound and an electron acceptor, the titanium trichloride being obtainable by reducing titanium tetrachloride with an organoaluminum compound;

(b) an organoaluminum compound; and (c) a cyclic ester compound.

6. The method for producing the multistage propylene-based polymer of 5, comprising producing a propylene homopolymer component or a copolymer component of propylene and an α-olefin with 2 to 8 carbon atoms having an intrinsic viscosity [η] of more than 10 dL/g in tetralin in an amount of 5 to 20 wt % of the polymer in the first polymerization stage, and producing a propylene homopolymer component or a copolymer component of propylene and an α-olefin with 2 to 8 carbon atoms having an intrinsic viscosity [η] of 0.5 to 3.0 dL/g in tetralin at 135° C. in an amount of 80 to 95 wt % of the polymer in the second polymerization stage.

7. A propylene-based resin composition comprising the multistage propylene-based polymer of any one of 1 to 4; and a propylene-based polymer having a melt flow rate of 30 g/10 min or less at 230° C. and a ratio of weight average molecular weight (Mw) to number average molecular weight (Mn) of 5 or less, the weight ratio of the propylene-based polymer to the multistage propylene-based polymer being eight times or more.

8. The propylene-based resin composition according to 7, wherein the ratio of the storage modulus G' (10) at an angular frequency of 10 rad/s to the storage modulus G' (1) at an angular frequency of 1 rad/s, G' (10)/G' (1) is 5 or more, and the ratio of the storage modulus G' (0.1) at an angular frequency of 0.1 rad/s to the storage modulus G' (0.01) at an angular frequency of 0.01 rad/s, G' (0.1)/G' (0.01), is 14 or less.

9. A propylene-based resin composition comprising (1) 100 parts by weight of the multistage propylene-based polymer described in any one of 1 to 4, and any one of the following components (2), (3), and (4):

(2) 0.1 to 10 parts by weight of a powdery or fibrous porous filler, (3) 0.05 to 1.0 parts by weight of a chemical foaming agent, and (4) 0.05 to 1.0 parts by weight of a crystallization nucleating agent.

10. The propylene-based resin composition according to 9, wherein the porous filler is silica, activated carbon, zeolite or silica gel having an average particle diameter of 50 μm or less, or fibrous activated carbon having a fiber diameter of 20 μm or less.

11. A formed product obtainable by foam-molding the multistage propylene-based polymer described in any one of 1 to 4 or the propylene-based resin composition described in any one of 7 to 10.

12. The formed product according to claim 11 which is an injection foam-molded product having an expansion ratio of 1.1 to 80 times, the product being obtainable by injection foam-molding using a supercritical carbon dioxide or supercritical nitrogen.

13. The formed product according to 11 which is an extrusion foam-molded product having an expansion ratio of 1.1 to 80 times.

14. A composite material comprising the multistage propylene-based polymer described in any one of 1 to 4 or the propylene-based resin composition described in any one of 7 to 10, and at least one material selected from fibers, fillers, and rubbers.

A multistage propylene-based polymer possessing high melt tension and outstanding viscoelasticity characteristics, a method for producing the same, and a propylene-based resin composition can be provided according to the invention.

BEST MODE FOR CARRYING OUT THE INVENTION

The multistage propylene-based polymer of the invention comprises (A) 5 to 20 wt % of a propylene homopolymer component or a copolymer component of propylene and an α-olefin with 2 to 8 carbon atoms having an intrinsic viscosity [η] of more than 10 dL/g in tetralin at 135° C. (hereinafter referred to as "component (A)") and (B) 80 to 95 wt % of a propylene homopolymer component or a copolymer component of propylene and an α-olefin with 2 to 8 carbon atoms having an intrinsic viscosity [η] of 0.5 to 3.0 dL/g in tetralin at 135° C. (hereinafter referred to as "component (B)").

The multistage polymer of the invention is a linear propylene-based polymer having increased melt tension which is achieved by providing the component (A), i.e. an ultrahigh molecular weight propylene-based polymer component, and having controlled viscoelastic characteristics due to controlled molecular weight distribution.

If the intrinsic viscosity of the component (A) is 10 dL/g or less, the melt tension is insufficient and foam-moldability is poor. If the weight percentage of the component (A) is less than 5 wt %, the melt tension is insufficient and foam-moldability is poor; if more than 20 wt %, melt fracture is intense, resulting in an extrusion molding failure.

The intrinsic viscosity of the component (A) is preferably 12 to 20 dL/g, and more preferably 13 to 18 dL/g. The weight percentage of the component (A) is preferably 8 to 18 wt %, and more preferably 10 to 16 wt %.

If the intrinsic viscosity of the component (B) is less than 0.5 dL/g, the melt tension is insufficient; if more than 3.0 dL/g, the viscosity is high and extrusion failure occurs. If the weight percentage of the component (B) is less than 80 wt %, extrusion molding failure occurs; if more than 95 wt %, the melt tension is low and foam-molding is difficult.

The intrinsic viscosity of the component (B) is preferably 0.8 to 2.0 dL/g, and more preferably 1.0 to 1.5 dL/g. The weight percentage of the component (B) is preferably 82 to 92 wt %, and more preferably 84 to 90 wt %.

As examples of the α-olefin with 2 to 8 carbon atoms forming the copolymer components in the multistage polymer of the invention, α-olefins other than propylene such as ethylene and 1-butane can be given. Of these, ethylene is preferable.

The melt flow rate at 230° C. of the multistage polymer of the invention is preferably 100 g/10 min or less, and more preferably 20 g/10 min or less. If more than 100 g/10 min, the melt tension and viscosity is too low and molding may become difficult.

The melt flow rate (MFR) at 230° C. and the melt tension (MT) at 230° C. of the multistage polymer of the invention preferably satisfy the relationship of the following formula (I).

$$\log(MT) > -1.33 \log(MFR) + 1.2 \quad (1)$$

A foam-molded product with a high expansion ratio may not be obtained if the formula (1) is not satisfied. The constant term of the right-hand side of the formula (1) is more preferably 1.3 or more, and still more preferably 1.4 or more.

In order to satisfy the relationship of the formula (I), it is sufficient for the multistage polymer of the invention to contain 5 wt % or more components with an intrinsic viscosity of more than 10 dL/g.

Preferably, as dynamic viscoelasticity (the relationship between angle frequency ω and storage modulus G') in a molten state of the multistage polymer of the invention, the inclination of storage modulus on the high frequency side is not smaller than a certain amount. Specifically, the ratio of the storage modulus G' (10) at an angular frequency ω of 10 rad/s to the storage modulus G' (1) at an angular frequency ω of 1 rad/s, G' (10)/G' (1), is preferably 2 or more, and more preferably 2.5 or more. If this ratio is less than 2, stability may be lowered when an external force such as a drawing force is applied to the foamed product.

In addition, as dynamic elasticity in a molten state of the multistage polymer of the invention, the inclination of storage modulus on the low frequency side is preferably not greater than a certain amount. Specifically, the ratio of the storage modulus G' (0.1) at an angular frequency ω of 0.1 rad/s to the storage modulus G' (0.01) at an angular frequency ω of 0.01 rad/s, G' (0.1)/G' (0.01), is preferably 6 or less, and more preferably 4.0 or less. If this ratio is more than 6, the expansion ratio of the foamed product may decrease.

The multistage polymer of the invention may be produced by polymerizing propylene or copolymerizing propylene and an α-olefin with 2 to 8 carbon atoms by using an olefin polymerization catalyst comprising the following components (a) and (b), or (a), (b), and (c) in 2 or more polymerization stages:

(a) a solid catalyst component obtainable by treating titanium trichloride with an ether compound and an electron acceptor, the titanium trichloride being obtainable by reducing titanium tetrachloride with an organoaluminum compound;

(b) an organoaluminum compound; and (c) a cyclic ester compound.

The following compounds can be given as examples of the organoaluminum compound which reduces titanium tetrachloride in the solid catalyst component (a): (α) alkylaluminum dihalide such as methylaluminum dichloride, ethylaluminum dichloride, and n-propylaluminum dichloride; (β) alkylaluminum sesquihalide such as ethylaluminum sesquichloride; (γ) dialkylaluminum halide such as dimethylaluminum chloride, diethylaluminum chloride, di-n-propylaluminum chloride, and diethylaluminum bromide; (δ) trialkylaluminum such as trimethylaluminum, triethylaluminum, and tri-isobutylaluminum; and (ε) dialkylaluminum hydride such as diethylaluminum hydride.

Here, "alkyl" refers to a lower alkyl such as methyl, ethyl, propyl, butyl, etc. "Halide" refers to chloride or bromide, and particularly the former is general.

The reducing reaction by an organoaluminum compound for obtaining titanium trichloride is usually carried out at a temperature in a range of −60° C. to 60° C., and preferably −30° C. to 30° C. If the temperature is less than the above range, the reducing reaction requires a long period of time; if more than the above range, excessive reduction undesirably partially occurs. The reducing reaction is preferably carried out in an inert hydrocarbon solvent such as pentane, hexane, heptane, octane, and decane.

The titanium trichloride obtained by the reducing reaction of titanium tetrachloride with an organoaluminum compound is preferably subjected to a treatment with ether and a treatment with an electron acceptor.

As examples of the ether compound preferably used in the treatment of titanium trichloride with ether, ether compounds of which the hydrocarbon residue is a linear hydrocarbon having 2 to 8 carbon-atoms, such as diethyl ether, di-n-propyl ether, di-n-butyl ether, diisoamyl ether, dineopentyl ether, di-n-hexyl ether, di-n-octyl ether, di-2-ethylhexyl ether, methyl n-butyl ether, and ethyl isobutyl ether can be given. Among these ether compounds, di-n-butyl ether is particularly preferably used.

As the electron acceptor used in the treatment of titanium trichloride, halogenated compounds of an element in the groups 3 to 4 and the group 8 of the periodic table are preferable. Specific examples that can be given include titanium tetrachloride, silicon tetrachloride, boron trifluoride, boron trichloride, antimony pentachloride, gallium trichloride, iron trichloride, tellurium dichloride, tin tetrachloride, phosphorus trichloride, phosphorus pentachloride, vanadium tetrachloride, and zirconium tetrachloride. The treatment of titanium trichloride with an ether compound and an electron acceptor in preparing a solid catalyst component (a) may be carried out simultaneously using a mixture of both treating agents or may be separately carried out one after another. Of these methods, the latter method, particularly the method of first treating with ether and then treating with an electron acceptor, is preferable.

It is generally preferable to wash titanium trichloride with hydrocarbon before the treatment with an ether compound and an electron acceptor. The treatment of titanium trichloride with an ether compound is carried out by causing the titanium trichloride to come in contact with the ether compound. In addition, it is advantageous to treat titanium trichloride with an ether compound by causing them to come in contact with each other in the presence of a diluting agent. As the diluting agent, an inert hydrocarbon compound such as hexane, heptane, octane, decane, benzene, and toluene is preferably used. The ether treating is carried out preferably at a temperature of 0° C. to 100° C. Although not specifically limited, the treating time is usually from 20 minutes to 5 hours.

The amount of the ether compound used is generally from 0.05 to 3.0 mols, and preferably from 0.5 to 1.5 mols, per one mol of the titanium trichloride. If the amount of the ether compound used is less than the above range, stereoregularity of the resulting polymer cannot be sufficiently promoted, which is undesirable. If the amount of the ether compound used is more than the above range, although stereoregularity of the resulting polymer can be sufficiently promoted, the yield is undesirably poor. The titanium trichloride treated with the organoaluminum compound or ether compound is specifically a composition containing titanium trichloride as a major component.

In the invention, Solvay-type titanium trichloride can be suitably used as such a solid catalyst component (a).

As the organoaluminum compound (b), the same compounds mentioned above can be given.

As the cyclic ester compound (c), γ-lactone, δ-lactone, ε-lactone, and the like can be given. Of these, ε-lactone is preferable.

The olefin polymerization catalyst used in the invention can be prepared by mixing the above components (a) to (c).

In the production method of the invention comprising two or more polymerization stages, it is preferable to polymerize propylene or copolymerize propylene and an α-olefin with 2 to 8 carbon atoms in the first polymerization stage in the absence of hydrogen.

An ultrahigh molecular weight propylene-based polymer, e.g. the component (A) in the multistage polymer of the invention, can be produced by polymerizing propylene or copolymerizing propylene and an α-olefin in the absence of hydrogen. In the production method of the invention, it is preferable to produce the component (B) of the multistage polymer in the second or subsequent polymerization stage. The reason is described below.

The multistage propylene-based polymer has a problem of the amount of fisheye production due to large molecular weight difference between the high molecular weight components and low molecular weight components. In addition, when the polymer is produced by a continuous polymerization method, the composition of the polymer particles become uneven according the residence time distribution, resulting in an increase in the amount of fisheyes. On the other hand, comparing the high molecular weight components with the low molecular weight components, that is, comparing the polymerization reaction rate in the absence of hydrogen with the polymerization reaction rate in the presence of hydrogen, the latter is several times higher than the former. For this reason, if the polymerization reaction for producing the low molecular weight components is carried out in the first polymerization stage, the polymerization reaction rate is very high because deactivation due to polymerization history does not occur. Therefore, the residence time must be reduced for adjusting the ratio of polymerization amounts. As a result, the amount of catalyst particles that do not participate in the polymerization reaction of the first stage increases, resulting in an increase of composition unevenness of the polymer particles as compared with the case in which the high molecular weight components are produced in the first stage. This composition unevenness of the polymer particles may unduly impair dispersibility of the high molecular weight components, inhibit the melt tension promoting effect, and lower the foaming characteristics of the resulting multistage propylene-based polymer.

The term "in the absence of hydrogen" herein refers to substantial absence of hydrogen and includes not only an atmosphere in which no hydrogen exists at all, but also an atmosphere in which a slight amount (e.g. about 10 mol ppm) of hydrogen exists. Specifically, an atmosphere in which hydrogen is present to the extent not reducing the intrinsic viscosity of the propylene-based polymer or copolymer produced in the first stage measured in tetralin at 135° C. to 10 dL/g or less falls under the definition of "in the absence of hydrogen."

With regard to the conditions for producing component (A) in the production method of the invention, the component (A) is preferably produced by polymerizing monomers by slurry polymerization in the absence of hydrogen at a temperature preferably in a range from 20 to 80° C., and more preferably from 40 to 70° C., under a pressure usually from atmospheric pressure to 1.47 MPa, and preferably from 0.39 to 1.18 MPa.

There are no specific limitations to the conditions for producing component (B), except for use of the above-mentioned olefin polymerization catalyst. Raw monomers are preferably polymerized in the presence of hydrogen as a molecular weight adjuster at a temperature preferably in a range from 20 to 80° C., and more preferably from 60 to 70° C., under a pressure usually from atmospheric pressure to 1.47 MPa, and preferably from 0.19 to 1.18 MPa.

It is desirable to produce a propylene homopolymer component or a copolymer component of propylene and an α-olefin with 2 to 8 carbon atoms having an intrinsic viscosity [η] of more than 10 dL/g in tetralin at 1.35° C. in an amount of 5 to 20 wt % of the polymer in the first polymerization stage, and produce a propylene homopolymer component or a copolymer component of propylene and an α-olefin with 2 to 8 carbon atoms having an intrinsic viscosity [η] of 0.5 to 3.0 dL/g in tetralin at 135° C. in an amount of 80 to 95 wt % of the polymer in the second polymerization stage appropriately adjusting the reaction time and the like under the above-mentioned conditions.

In the production method of the invention, preliminary polymerization may be carried out before the main polymerization. Preliminary polymerization ensures excellent powder morphology. In the preliminary polymerization, propylene is polymerized or a mixture of propylene and an α-olefin with 2 to 8 carbon atoms is copolymerized at a polymerization temperature of preferably 0 to 80° C., and more preferably 10 to 60° C., using preferably 0.001 to 100 g, and more preferably 0.1 to 10 g of the monomers per 1 g of a solid catalyst.

The propylene-based resin composition of the invention comprises the above multistage propylene-based polymer and a propylene-based polymer having a melt flow rate (MFR) of 30 g/10 min or less at 230° C. and a ratio (Mw/Mn) of weight average molecular weight (Mw) to number average molecular weight (Mn) of 5 or less. Foaming moldability can be improved and, at the same time, either foam-molded product can be provided with high functions or production cost can be reduced by the composition in which the multistage polymer of the invention is blended with another material.

Because the composition of the invention possesses high melt tension and outstanding viscoelastic characteristics, foamed sheet products having an excellent outward surface appearance and not being cut during drawing in the sheet forming process can be obtained at a high expansion ratio.

The weight ratio of the propylene-based polymer to the multistage propylene-based polymer in the composition of the invention is eight times or more, and preferably ten times or more. If the weight ratio is less than eight times, the products have a poor outward surface appearance.

The MFR of the propylene-based polymer is 30 g/10 min or less, preferably 15 g/10 min or less, and more preferably 10 g/10 min or less. If the MFR is more than 30 g/10 min, moldability is impaired.

The Mw/Mn of the propylene-based polymer is 5 or less, and preferably 4.5 or less. If the Mw/Mn is greater than 5, the products have a poor outward surface appearance.

The propylene-based polymer can be produced by a known polymerization method using Ziegler-Natta catalyst, a metallocene catalyst, or the like.

As dynamic viscoelasticity (the relationship between angle frequency ω and storage modulus G') in a molten state, the composition of the invention preferably has an inclination of storage modulus on the high frequency side not smaller than a certain amount and an inclination of storage modulus on the low frequency side not greater than a certain amount. Specifically, the ratio G' (10)/G' (1) is preferably 5 or more, and more preferably 5.5 or more. If this ratio is less than 5, stability may be lowered when an external force such as a drawing force is applied to the foamed product.

In addition, the ratio G' (0.1)/G' (0.01) is preferably 14 or less, and more preferably 12 or less. If this ratio is more than 14, the expansion ratio of the foamed product may decrease.

In general, when a foamed resin is drawn, components with a relaxation time of about 1 to 10 seconds exhibit an adverse effect on the drawing characteristics of the foamed product. The greater the contribution of the relaxation time in this range, the smaller the inclination of the storage modulus G' (1) at an angular frequency ω near 1 rad/s. Taking the ratio of the storage modulus G' (10) at an angular frequency ω of 10 rad/s to the storage modulus G' (1), G' (10)/G' (1), as a standard of this inclination, the results of a numerical simulation and experimental analysis confirmed that the smaller the value, the greater the foam-burst pressure during drawing in an extrusion-foaming process. Therefore, the ratio G' (10)/G' (1) is preferably 5 or more in the composition of the invention.

Because a certain degree of strain hardening capability is demanded to cope with foam breaking in the final stage of foam growing or foam breaking due to high speed drawing deformation near die lips during injection foaming or extrusion foam-molding, an appropriate amount of high molecular weight components is necessary in a suitable relaxation time region. To this end, G' in a low frequency region must be large to some extent. Therefore, the ratio of the storage modulus G' (0.1) at an angular frequency ω of 0.1 rad/s to the storage modulus G' (0.01) at an angular frequency ω of 0.01 rad/s, G' (0.1)/G' (0.01), was provided as a standard. As a result of a numerical simulation and experimental analysis, it was found that the greater the value, the more remarkable is the decrease of expansion ratio due to foam-breaking. Therefore, the ratio G' (0.1)/G' (0.01) is preferably 14 or less in the composition of the invention.

The composition of the invention may optionally contain additives such as an antioxidant, neutralizer, flame retardant, crystallization nucleating agent, and the like. There are no specific limitations to the proportion of additives. The amount may be appropriately adjusted.

As another embodiment of the propylene-based resin composition of the invention, a resin composition comprising (1) 100 parts by weight of the above-described multistage propylene-based polymer and any one of the following components (2), (3), and (4):

(2) 0.1 to 10 parts by weight of a powdery or fibrous porous filler, (3) 0.05 to 1.0 parts by weight of a chemical foaming agent, and (4) 0.05 to 1.0 parts by weight of a crystallization nucleating agent can be given.

The propylene-based resin composition obtained by adding these components to the multistage propylene-based polymer (1) can produce a foamed product with a reduced cell diameter.

As the powdery or fibrous porous filler of component (2), silica, activated carbon, zeolite or silica gel having an average particle diameter of 50 μm or less, or fibrous activated carbon having a fiber diameter of 20 μm or less can be preferably used.

As the chemical foaming agent of component (3), a decomposition type foaming agent is preferably used.

As the decomposition type foaming agent, bicarbonates such as sodium bicarbonate, organic acids such as citric acid or a combination of organic acid and a salt thereof, and organic foaming agents such as azodicarbonamide, dinitrosopentamethylenetetramine, and the like can be used. These foaming agents may be used either individually or in combination of two or more. In addition, as a foam adjusting agent, talc, sodium bicarbonate, citric acid, and the like may be added.

As the crystallization nucleating agent of component (4), talc, organic carboxylates, organic phosphates, and sorbitol nucleating agents can be preferably used.

A composite material can be produced by combining the multistage polymer or the composition of the invention and at least one material selected from fibers, fillers, and rubbers.

As examples of the fiber, glass fiber, carbon fiber, and organic fiber can be given. Of these, glass fiber and organic fiber are preferable.

As examples of the filler, talc, carbon black, calcium carbonate, mica, and porous silica can be given. Of these, talc, calcium carbonate, mica, and porous silica are preferable.

As examples of the rubber, EPR, EPDM, EBM, and SEBS can be given.

There are no specific limitations to the proportion of these materials. The amount may be appropriately adjusted.

The multistage polymer or the composition of the invention can be formed by various molding methods such as extrusion molding, injection molding, foam molding, and hollow molding, preferably by foam molding such as injection foam molding and extrusion foam molding.

When the multistage polymer or the composition of the invention is formed by foam molding, various foaming agents such as carbon dioxide gas, butane, nitrogen, and sodium bicarbonate can be used.

When the multistage polymer or the composition of the invention is formed by injection foam molding, super critical carbon dioxide or super critical nitrogen is preferably used as a foaming agent.

The expansion ratio of foamed products obtained in the invention produced by injection foam molding or extrusion foam molding is 1.1 to 80 times, and preferably 2.0 to 80 times.

EXAMPLES

The invention is described below by way of examples. However, the invention should not be construed as being limited to the following examples.

The following methods of preparation and measurement apply to the items in the tables below.

(1) Weight Percentages of a Propylene-Based Polymer Component in the First Stage (Component 1) and a Propylene-Based Polymer Component in the Second Stage (Component 2)

These weight percentages were determined from the material balance, in which the flow meter integrated values of propylene continuously supplied during polymerization were used.

(2) Intrinsic Viscosity [η]

The intrinsic viscosity was measured in tetralin at 135° C.
The intrinsic viscosity of component 2, $[\eta]_2$, was calculated using the following formula:

$$[\eta]_2 ([\eta]_{total} 100 - [\eta]_1 \times W_1)/W_2$$

$[\eta]_{total}$: intrinsic viscosity of the whole propylene polymer
$[\eta]_1$: intrinsic viscosity of component 1
$W_1$: weight percent (wt %) of component 1
$W_2$: weight percent (wt %) of component 2

(3) Propylene Polymer Pellets 0.15 part by weight of "Irganox 1010" (manufactured by Ciba Specialty Chemicals Co.), 0.15 part by weight of "Irgaphos 168" (manufactured by Ciba Specialty Chemicals Co.), 0.06 part by weight of calcium stearate, and 0.06 part by weight of "DHT-4A" (manufactured by Kyowa Chemical Industry Co., Ltd.) were added to 100 parts by weight of the propylene-based polymer powder obtained and the mixture was melt kneaded at 230° C. using a 20 mm φ uniaxial extruder ("Labo Plastomill" manufactured by Toyo Seiki Seisaku-Sho, Ltd.).

(4) Melt Flow Rate (MFR)

Measured according to JIS K7210 at 230° C. under a load of 2.16 kgf.

(5) Melt Tension (MT)

Measured at a temperature of 230° C. and a drawing speed of 3.1 m/min using "Capirograph 1C" (manufactured by Toyo Seiki Seisaku-Sho, Ltd.). An orifice with a length of 8 mm and a diameter of 2.095 mm was used.

(6) Mw/Mn and Mz/Mw

Determined from the weight average molecular weight (Mw), the number average molecular weight (Mn), and the Z-average molecular weight (Mz), which were measured by gel permeation chromatography (GPC). The column and measuring conditions are as follows.

Column: TOSOH GMHHR-H(S)HT
Measurement temperature: 145° C.
Solvent: 1,2,4-trichlorobenzene
Flow rate: 1.0 ml/min (7) Viscoelastic Characteristics Measured using the following instrument under the following conditions.
Instrument: "RMS-800" manufactured by Rheometrix Co., Ltd.
Temperature: 190° C., distortion: 30%
Frequency: 100 rad/s to 0.01 rad/s
The storage modulus G' can be determined from the actual number portion of complex modulus.

(8) Expansion Ratio

The expansion ratio of foam-molded products was calculated using the density, which was determined by dividing the weight of the molded product by the volume measured by a submersion method.

(9) Outward Surface Appearance

Corrugated marks (streak-like marks) impairing an outward surface appearance produced on foamed sheets were inspected by the naked eye. Those in which corrugate marks are not observed were rated as "○", obscurely observed were rated as "Δ", and clearly observed were rated as "X".

The foam-molded products were prepared by the following methods.

<Injection Foam-Molded Products>

Injection foam-molded products were obtained by simply extruding from the following injection molding machine.
Molding machine: J180EL-MuCell manufactured by The Japan Steel Works, Ltd.
Injection time: 5 seconds
Cylinder set temperature: 180° C.
Amount of gas: 5 wt % (carbon dioxide)
Injection pressure: 15 MPa <Extrusion Foam-Molded Products (Foamed Sheet)>

Foamed sheets of propylene-based resin were produced under the following conditions.
Molding machine: biaxial extruder "TEM-41SS" manufactured by Toshiba Machine Co., Ltd.
Die shape: round die
Die size: 65 mm
Amount of extrusion: 50 kg/hr
Screw rotation: 100 rpm
Resin temperature: 190° C.
Cylinder set temperature: 210° C.
Die set temperature: 170° C.
Amount of carbon dioxide gas: 300 g/hr
Foaming agent: 0.5 part of sodium bicarbonate/citric acid-based chemical foaming agent "EE205" manufactured by Eiwa Chemical Ind. Co., Ltd.

Preparation Example 1

(1) Preparation of Solid Catalyst Component

A 5 l three neck flask with a stirrer, of which the internal atmosphere was replaced with nitrogen, was charged with 160 g (1.4 mol) of diethoxymagnesium, followed by the addition of 500 ml of dehydrated heptane. After heating to 40° C., 28.5 ml (225 mmol) of silicon tetrachloride was added and the mixture was stirred for 20 minutes, followed by the addition of 127 mmol of diethyl phthalate. The solution was heated to 80° C. and 461 ml (4.2 mols) of titanium tetrachloride was added using a dripping funnel. The mixture was stirred for two hours while maintaining the internal temperature at 110° C., thereby completing a supporting operation. After thoroughly washing with dehydrated heptane, 768 ml (7 mols) of titanium tetrachloride was further added, and the mixture was stirred for two hours while maintaining the internal temperature at 110° C., thereby completing a second supporting operation. The resulting solid was thoroughly washed with dehydrated heptane to obtain a solid catalyst component.

(2) Preliminary Polymerization of Solid Catalyst Component

A 1 l three neck flask equipped with a stirrer, of which the internal atmosphere was replaced with nitrogen, was charged with a heptane slurry containing 60 g (37.6 mmol-Ti) of the solid titanium catalyst component, followed by the addition of dehydrated heptane to make the total volume 500 ml. The mixture was stirred while controlling the temperature at 40° C. and 24.8 mmol of triethylaluminum and 6.2 mmol of cyclohexyldimethoxysilane were added. A prescribed amount of propylene was absorbed at 40° C. for 120 minutes to replace residual propylene with nitrogen. The resulting solid was thoroughly washed with heptane to obtain 85 g of a preliminary polymerization catalyst component (seal amount: 0.43 g-PP/g solid titanium catalyst component).

(3) Slurry Polymerization of Propylene

A 10 l stainless steel autoclave equipped with a stirrer was sufficiently dried and the internal atmosphere was replaced with nitrogen, following which 6 l of dehydrated heptane was added. The autoclave was heated to 80° C. and 12 mmol of triethylaluminum and 1.2 mmol of cyclohexylmethyldimethoxysilane were added. Then, after introducing 0.03 MPa of hydrogen, propylene was introduced to make the total pressure 0.78 MPa. After the system was stabilized, the above preliminary polymerization catalyst component was added in an amount of 0.3 mmol as titanium, thereby starting the polymerization. After one hour, 50 ml of methanol was added to the system to terminate the polymerization. The temperature and pressure were allowed to decrease. After removing the reaction mixture, a solid was collected by filtration and dried in a dry nitrogen stream at 70° C. for 12 hours, thereby obtaining 2.4 kg of a propylene polymer.

Preparation Example 2

(1) Preliminary Polymerization

A 5 l three neck flask equipped with a stirrer was sufficiently dried and the internal atmosphere was replaced with nitrogen. Then, 4 l of dehydrated heptane and 140 g of diethylaluminum chloride were charged, followed by the addition of 20 g of a commercially available Solvay-type titanium trichloride catalyst (manufactured by Tosoh Finechem Corp.) Propylene was continuously introduced while stirring the mixture and controlling the internal temperature at 20° C. After 80 minutes, stirring was terminated to obtain a preliminary polymerization catalyst component in which 0.8 g of propylene per 1 g of the solid catalyst was polymerized.

(2) Polymerization of Propylene

A 10 l stainless steel autoclave equipped with a stirrer was sufficiently dried and the internal atmosphere was replaced with nitrogen. After adding 6 l of dehydrated heptane, nitrogen in the system was replaced with propylene. The internal temperature was increased to 60° C., 0.078 MPa of hydrogen was added, and propylene was introduced while stirring. After the system conditions were stabilized at a total pressure of 0.78 MPa and an internal temperature of 60° C., 50 ml of heptane slurry containing the above preliminary polymerization catalyst component in an amount of 0.75 g (solid catalyst basis) was added to start the polymerization. After continuously supplying propylene for four hours from the start of polymerization, 50 ml of methanol was added to terminate the polymerization. The temperature and pressure were allowed to decrease. The entire content was transferred to a filtering vessel with a filter fitted thereto and 100 ml of 1-butanol was added. The mixture was stirred at 85° C. for one hour, followed by solid-liquid separation. The solid washed twice with 6 l of heptane at 85° C. and dried under vacuum to obtain 3.8 kg of a propylene polymer.

Properties and resin characteristics of the polymers obtained in Preparation Examples 1 and 2 are shown in Table 1.

TABLE 1

|  |  | Preparation Example | |
|---|---|---|---|
|  |  | 1 | 2 |
| Propylene polymer | Intrinsic viscosity (dL/g) | 1.68 | 1.87 |
|  | Weight percent (wt %) | 100 | 100 |
| Propylene polymer pellets | Intrinsic viscosity (dL/g) | 1.68 | 1.87 |
|  | MFR (g/10 min) | 6.6 | 7.6 |
|  | Mw/Mn | 4.0 | 7.5 |
|  | Mz/Mw | 3.1 | 5.6 |
|  | MT (g) | 0.4 | 0.6 |

Example 1

(1) Preliminary Polymerization

A preliminary polymerization catalyst component was obtained in the same manner as in Preparation Example 2.

(2) Polymerization of Propylene

A 10 l stainless steel autoclave equipped with a stirrer was sufficiently dried and the internal atmosphere was replaced with nitrogen. After adding 6 l of dehydrated heptane, nitrogen in the system was replaced with propylene. Then, propylene was introduced with stirring. After the system conditions were stabilized at a total pressure of 0.78 MPa and an internal temperature of 60° C., 50 ml of heptane slurry containing the above preliminary polymerization catalyst component in an amount of 0.75 g (solid catalyst basis) was added to initiate the polymerization. After continuously supplying propylene for 15 minutes, the amount of the resulting polymer determined from the flow rate integrated value of propylene was 151 g. A portion of the polymer was sampled and analyzed to confirm that the intrinsic viscosity was 14.8 dL/g. After that, the internal temperature was allowed to decrease to 40° C. or less and the rate of stirring and pressure were reduced.

The internal temperature was again increased to 60° C., 0.15 MPa of hydrogen was added, and propylene was introduced while stirring. Polymerization was carried out at 60° C. for 3.5 hours, while continuously supplying propylene at a total pressure of 0.78 MPa. A portion of the polymer was sampled and analyzed to confirm that the intrinsic viscosity was 1.84 dL/g.

After the polymerization, 50 ml of methanol was added and the temperature and pressure was allowed to decrease. The entire content was transferred to a filtering vessel with a filter fitted thereto and 100 ml of 1-butanol was added. The mixture was stirred at 85° C. for one hour, followed by solid-liquid separation. The solid washed twice with 6 l of heptane at 85° C. and dried under vacuum to obtain 3.0 kg of a multistage propylene polymer.

As a result of the above experiments, it was determined that the polymerization weight ratio in the first and second stages was 5.0:95.0 and the intrinsic viscosity of the polymer component obtained in the second stage was 1.16 dL/g.

Example 2

Polymerization was carried out in the same manner as in Example 1, except that the polymerization time of the first stage was 25 minutes and the second stage was 2.8 hours. As a result, 3.1 kg of a multistage propylene polymer was obtained. It was determined that the polymerization weight ratio in the first and second stages was 9.5:90.5 and the intrinsic viscosities of the polymer components obtained in the first and second stages were respectively 14.2 dL/g and 1.18 dL/g.

Example 3

Polymerization was carried out in the same manner as in Example 1, except that the polymerization time of the first stage was 35 minutes and the second stage was 2.3 hours. As a result, 3.2 kg of a propylene polymer was obtained. It was determined that the polymerization weight ratio in the first and second stages was 12.2:87.8 and the intrinsic viscosities of the polymer components obtained in the first and second stages were respectively 14.1 dL/g and 1.08 dL/g.

Example 4

(1) Preliminary Polymerization

A preliminary polymerization catalyst component was obtained in the same manner as in Preparation Example 2.

(2) Polymerization of Propylene

A 10 l stainless steel autoclave equipped with a stirrer was sufficiently dried and the internal atmosphere was replaced with nitrogen. After adding 6 l of dehydrated heptane, nitrogen in the system was replaced with propylene. Then, propylene was introduced with stirring. After the system conditions were stabilized at a total pressure of 0.78 MPa and an internal temperature of 70° C., 50 ml of heptane slurry containing the above preliminary polymerization catalyst component in an amount of 0.75 g (solid catalyst basis) was added to initiate the polymerization. After continuously supplying propylene for 22 minutes, the amount of the resulting polymer determined from the flow rate integrated value of propylene was 322 g. A portion of the polymer was sampled and analyzed to confirm that the intrinsic viscosity was 10.6 dL/g. After that, the internal temperature was allowed to decrease to 40° C. and the rate of stirring and pressure were reduced.

The internal temperature was increased to 60° C., 0.15 MPa of hydrogen was added, and propylene was introduced while stirring. Polymerization was carried out at 60° C. for 2.7 hours, while continuously supplying propylene at a total pressure of 0.78 MPa.

After the polymerization, 50 ml of methanol was added and the temperature and pressure were allowed to decrease. The entire content was transferred to a filtering vessel with a filter fitted thereto and 100 ml of 1-butanol was added. The mixture was stirred at 85° C. for one hour, followed by solid-liquid separation. The solid washed twice with 6 l of heptane at 85° C. and dried under vacuum to obtain 3.0 kg of a multistage propylene polymer. It was determined that the polymerization weight ratio in the first and second stages was 10.6:89.4 and the intrinsic viscosity of the polymer component obtained in the second stage was 1.16 dL/g.

Comparative Example 1

(1) Preliminary Polymerization

A preliminary polymerization catalyst component was obtained in the same manner as in Preparation Example 2.

(2) Polymerization of Propylene

A 10 l stainless steel autoclave equipped with a stirrer was sufficiently dried and the internal atmosphere was replaced with nitrogen. After adding 6 l of dehydrated heptane, nitrogen in the system was replaced with propylene. Then, propylene was introduced with stirring. After the system conditions were stabilized at a total pressure of 0.78 MPa and an internal temperature of 60° C., 50 ml of heptane slurry containing the above preliminary polymerization catalyst component in an amount of 0.75 g (solid catalyst basis) was added to initiate the polymerization. After continuously supplying propylene for 1.5 hours, the amount of the resulting polymer determined from the flow rate integrated value of propylene was 740 g. A portion of the polymer was sampled and analyzed to confirm that the intrinsic viscosity was 14.8 dL/g. After that, the internal temperature was allowed to decrease to 40° C. and the rate of stirring and pressure were reduced.

The internal temperature was again increased to 60° C., 0.15 MPa of hydrogen was added, and propylene was introduced while stirring. Polymerization was carried out at 60° C. for 1.8 hours, while continuously supplying propylene at a total pressure of 0.78 MPa.

After completion of the polymerization, 50 ml of methanol was added and the temperature and pressure were allowed to decrease. The entire content was transferred to a filtering vessel with a filter fitted thereto and 100 ml of 1-butanol was added. The mixture was stirred at 85° C. for one hour, followed by solid-liquid separation. The solid washed twice with 6 l of heptane at 85° C. and dried under vacuum to obtain 3.0 kg of a propylene polymer. It was determined that the polymerization weight ratio in the first and second stages was 24.6:75.4 and the intrinsic viscosity of the polymer component obtained in the second stage was 1.32 dL/g.

Comparative Example 2

(1) Preparation of Solid Catalyst Component

The internal atmosphere of a 0.5 l three neck flask equipped with a stirrer was replaced with nitrogen, and 60 ml of dehydrated octane and 16 g of diethoxymagnesium were added. After heating to 40° C., 2.4 ml of silicon tetrachloride was added and the mixture was stirred for 20 minutes, followed by the addition of 1.6 ml of dibutyl phthalate. The solution was heated to 80° C. and 77 ml of titanium tetrachloride was added dropwise. The mixture was stirred at 125° C. for two hours to cause the components to come in contact with each other. After that, stirring was terminated to precipitate a solid and remove the supernatant. 100 ml of dehydrated octane was added to the solid and the mixture was heated to 125° C. while stirring. After maintaining the mixture for one minute at this temperature, stirring was terminated to precipitate a solid and remove the supernatant. This operation was repeated seven times. 122 ml of titanium tetrachloride was further added, and the mixture was stirred at 125° C. for two hours, thereby completing a second contact operation. The above washing with dehydrated octane at 125° C. was repeated six times to obtain a solid catalyst component.

(2) Preliminary Polymerization

The internal atmosphere of a 0.5 l three neck flask equipped with a stirrer was replaced with nitrogen, and 400 ml of dehydrated heptane, 25 mmol of triisobutylaluminum, 2.5 mmol of dicyclopentyldimethoxysilane, and 4 g of the above solid catalyst component were added. The mixture was heated to 50° C. and propylene was introduced while stirring. After one hour, stirring was terminated to obtain a preliminary polymerization catalyst component in which 4 g of propylene per 1 g of the solid catalyst was polymerized.

(3) Polymerization of Propylene

A 10 l stainless steel autoclave equipped with a stirrer was sufficiently dried and the internal atmosphere was replaced with nitrogen, following which 6 l of dehydrated heptane, 12.5 mmol of triethylaluminum, and 1.2 mmol of dicyclopentyldimethoxysilane were added. After replacing nitrogen in the system with propylene, propylene was introduced while stirring. After the system conditions were stabilized at an internal temperature of 80° C. and propylene pressure of 0.78 MPa, 50 ml of heptane slurry containing the above preliminary polymerization catalyst component in an amount of 0.15 mmol (as Ti atom) was added to initiate the polymerization. When propylene was continuously supplied for two hours, the amount of the resulting polymer determined from the flow rate integrated value of propylene was 210 g. A portion of the polymer was sampled and analyzed to confirm that the intrinsic viscosity was 7.3 dL/g. After that, the internal temperature was allowed to decrease to 40° C. and the rate of stirring and pressure were reduced.

The internal temperature was increased to 80° C., 0.15 MPa of hydrogen was added, and propylene was introduced while stirring. Polymerization was carried out at 80° C. for two hours, while continuously supplying propylene at a total pressure of 0.78 MPa. After the polymerization, 50 ml of methanol was added and the temperature and pressure was allowed to decrease. The entire content was transferred to a filtering vessel with a filter fitted thereto and heated to 85° C., followed by solid-liquid separation. The solid washed twice with 6 l of heptane at 85° C. and dried under vacuum to obtain 2.8 kg of a propylene polymer. It was determined that the polymerization weight ratio in the first and second stages was 7.4:92.6 and the intrinsic viscosity of the polymer component obtained in the second stage was 1.46 dL/g.

Comparative Example 3

(1) Preliminary Polymerization

A preliminary polymerization catalyst component was obtained in the same manner as in Preparation Example 2.

(2) Polymerization of Propylene

A 10 l stainless steel autoclave equipped with a stirrer was sufficiently dried and the internal atmosphere was replaced with nitrogen. After adding 6 l of dehydrated heptane, nitrogen in the system was replaced with propylene. Hydrogen was added to a pressure of 0.059 MPa and propylene was introduced while stirring. After the system conditions were stabilized at an internal temperature of 65° C. and propylene pressure of 0.74 MPa, 50 ml of heptane slurry containing the above preliminary polymerization catalyst component in an amount of 0.5 g (solid catalyst basis) was added. Polymerization was carried out at 65° C. for three hours, while continuously supplying propylene. The amount of the resulting polymer determined from the flow rate integrated value of propylene was 550 g. A portion of the polymer was sampled and analyzed to confirm that the intrinsic viscosity was 5.2 dL/g.

After that, the internal temperature was allowed to decrease to 50° C. and the rate of stirring and pressure were reduced. 0.039 MPa of hydrogen was added and propylene was introduced while stirring. The mixture was polymerized at an internal temperature of 50° C. and propylene pressure of 0.74 MPa, while continuously supplying propylene for three hours.

After the polymerization, 50 ml of methanol was added and the temperature and pressure were allowed to decrease. The entire content was transferred to a filtering vessel with a filter fitted thereto and 100 ml of 1-butanol was added. The mixture was stirred at 85° C. for one hour, followed by solid-liquid separation. The solid washed twice with 6 l of heptane at 85° C. and dried under vacuum to obtain 2.4 kg of a propylene polymer. It was determined that the polymerization weight ratio in the first and second stages was 22.7:77.3 and the intrinsic viscosity of the polymer obtained in the second stage was 2.7 dL/g.

Properties and resin characteristics of the polymers obtained in Examples 1 to 4 and Comparative Examples 1 to 3 are shown in Table 2.

TABLE 2

|  |  | Example | | | | Comparative Example | | |
| --- | --- | --- | --- | --- | --- | --- | --- | --- |
|  |  | 1 | 2 | 3 | 4 | 1 | 2 | 3 |
|  | Catalyst system | $TiCl_3$ | $TiCl_3$ | $TiCl_3$ | $TiCl_3$ | $TiCl_3$ | Carrying $MgCl_2$ | $TiCl_3$ |
| Propylene polymer component of first stage | Intrinsic viscosity (dL/g) | 14.8 | 14.2 | 14.1 | 10.4 | 14.8 | 7.3 | 5.2 |
|  | Weight percent (wt %) | 5.0 | 9.5 | 12.2 | 10.6 | 24.6 | 7.4 | 22.7 |
| Propylene polymer component of second stage | Intrinsic viscosity (dL/g) | 1.16 | 1.18 | 1.08 | 1.16 | 1.32 | 1.46 | 2.7 |
|  | Weight percent (wt %) | 95.0 | 90.5 | 87.8 | 89.4 | 75.4 | 92.6 | 77.3 |
| Propylene polymer pellets | Intrinsic viscosity (dL/g) | 1.84 | 2.42 | 2.67 | 2.14 | 4.63 | 2.45 | 3.27 |
|  | MFR (g/10 min) | 11.7 | 4.7 | 3.3 | 6.1 | 2.2 | 3.0 | 0.5 |
|  | Mw/Mn |  | 15.2 |  |  |  |  |  |
|  | Mz/Mw |  | 5.9 |  |  |  |  |  |
|  | MT (g) | 1.4 | 4.3 | 7.6 | 2.7 | 25.4 | 1.7 | 5.8 |

TABLE 2-continued

|  |  | Example | | | | Comparative Example | | |
| --- | --- | --- | --- | --- | --- | --- | --- | --- |
|  |  | 1 | 2 | 3 | 4 | 1 | 2 | 3 |
| Viscoelastic | G' (10)/G' (1) | 3.83 | 2.87 | 2.68 | 3.23 | 1.7 | 5.16 | 3.5 |
| characteristics | G' (0.1)/G' (0.01) | 5.67 | 3.35 | 2.96 | 5.48 | 4.79 | 11.46 | 8.86 |
| Foaming characteristics | Expansion ratio | 14 | 17 | 20 | 10 | * | 2.5 | 4.0 |

*Extruding was impossible.

Example 5

10 parts by weight of propylene polymer obtained in Example 2 and 90 parts by weight of propylene polymer obtained in Preparation Example 1 were blended to make the total amount 100 parts by weight and molded into a foamed sheet under the above-described molding conditions.

Comparative Example 4

20 parts by weight of propylene polymer obtained in Example 2 and 80 parts by weight of propylene polymer obtained in Preparation Example 1 were blended to make the total amount 100 parts by weight and molded into a foamed sheet under the above-described molding conditions.

Comparative Example 5

A foamed sheet was molded from the propylene polymer obtained in Preparation Example 1 under the above-described molding conditions.

Comparative Example 6

A foamed sheet was molded from the propylene polymer obtained in Preparation Example 2 under the above-described molding conditions.

Properties and viscoelastic characteristics of the blends (compositions) or polymers described in Example 5 and Comparative Examples 4 to 6, and foamed sheet characteristics (expansion ratio, outward surface appearance) are shown in Table 3.

TABLE 3

|  |  | Example 5 | Comparative Example | | |
| --- | --- | --- | --- | --- | --- |
|  |  |  | 4 | 5 | 6 |
| Polymer of Example 5 (wt %) |  | 10 | 20 |  |  |
| Polymer of Preparation Example 1 (wt %) |  | 90 | 80 | 100 |  |
| Polymer of Preparation Example 2 (wt %) |  |  |  |  | 100 |
| Characteristics of blend product or polymer | Intrinsic viscosity (dL/g) | 1.74 | 1.98 | 1.68 | 1.87 |
|  | MFR (g/10 min) | 6.3 | 6.1 | 6.6 | 7.6 |
|  | MT (g) | 1.0 | 1.4 | 0.4 | 0.6 |
| Viscoelastic characteristics | G' (10)/G' (1) | 5.83 | 5.17 | 7.84 | 5.69 |
|  | G' (0.1)/G' (0.01) | 9.86 | 19.7 | 16.7 | 14.4 |
| Foaming characteristics | Expansion ratio | 3.0 | 2.8 | 2.0 | 2.8 |
|  | Outward surface appearance | ○ | Δ | X | Δ |

<Continuous Polymerization of Multistage Propylene-Based Polymer>

Example 6

A polymerization vessel with an internal volume of 200 l equipped with a stirrer was continuously charged with heptane at a rate of 6.3 kg/hr, a heptane solution of diethylaluminum chloride (DEAC) (1.8 g-DEAC/L-C7) at a rate of 1.5 kg/hr, and the preliminary polymerization catalyst component described in Preparation Example 2 at a rate of 1.5 g/hr. Propylene was continuously supplied at 50° C. substantially in the absence of hydrogen, while maintaining the internal pressure of the polymerization vessel at 0.50 MPa (gauge) (first stage polymerization).

A sample of slurry in this polymerization vessel was collected and intrinsic viscosity [η] of the propylene polymer obtained was measured to confirm that the [η] was 15.0 dl/g.

Next, the resulting slurry was continuously fed to another 200 l polymerization vessel equipped with a stirrer and further polymerized. Propylene and hydrogen were continuously supplied to the polymerization vessel at 65° C. and an internal pressure of 0.60 MPa (gauge) to maintain a gas phase hydrogen concentration of 7.0 mol % (second stage polymerization).

A multistage propylene polymer was obtained at a rate of 5.0 kg/h from the slurry discharged from the polymerization vessel by removing unreacted monomers, removing heptane by centrifugal separation, and drying the residue.

The intrinsic viscosity [η] of the multistage propylene polymer was 3.24 dl/g and the MFR of pellets obtained by adding a prescribed amount of additives and granulating the mixture was 2.0 g/10 min.

The proportion of polypropylene obtained in the first stage polymerization in the multistage propylene polymer determined from the material balance was 14.2 wt %.

Properties and resin characteristics of polymers of Example 6 and the following Example 7 are shown in Table 4.

TABLE 4

|  |  | Example | |
| --- | --- | --- | --- |
|  |  | 6 | 7 |
| Propylene polymer component of first stage | Intrinsic viscosity (dL/g) | 15.0 | 1.32 |
|  | Weight percent (wt %) | 14.2 | 85.7 |
| Propylene polymer component of second stage | Intrinsic viscosity (dL/g) | 1.30 | 14.8 |
|  | Weight percent (wt %) | 85.8 | 14.3 |
| Propylene polymer pellets | Intrinsic viscosity (dL/g) | 3.24 | 3.25 |
|  | MFR (g/10 min) | 2.0 | 1.9 |
|  | MT (g) | 7.7 | 4.3 |
| Viscoelastic characteristics | G' (10)/G' (1) | 3.48 | 3.24 |
|  | G' (0.1)/G' (0.01) | 5.61 | 9.82 |
| Foaming characteristics | Expansion Ratio | 22 | 6 |

Example 7

A polymerization vessel with an internal volume of 200 l equipped with a stirrer was continuously charged with heptane at a rate of 6.3 kg/hr, a DEAC heptane solution (1.8 g-DEAC/L-C7) at a rate of 1.5 kg/hr, and the preliminary polymerization catalyst component described in Preparation Example 2 at a rate of 1.5 g/hr. Propylene and hydrogen were continuously supplied to the polymerization vessel at 65° C. and an internal pressure of 0.60 MPa (gauge) to maintain a gas phase hydrogen concentration of 7.0 mol % (first stage polymerization). A sample of slurry in this polymerization vessel was collected and the intrinsic viscosity [η] of the propylene polymer obtained was measured to confirm that the [η] was 1.32 dl/g. The resulting slurry was continuously fed to a deaeration vessel with an internal volume of 200 l equipped with a stirrer and hydrogen in the gaseous phase was sufficiently removed.

Next, the resulting slurry was continuously fed to another 200 l polymerization vessel equipped with a stirrer and further polymerized. Propylene was continuously supplied to this polymerization vessel at 50° C. substantially in the absence of hydrogen, while maintaining the internal pressure of the polymerization vessel at 0.65 MPa (gauge) (second stage polymerization).

A multistage propylene polymer was obtained at a rate of 4.8 kg/hr from the slurry discharged from the polymerization vessel by removing unreacted monomers, removing heptane by centrifugal separation, and drying the residue.

The intrinsic viscosity [η] of the multistage propylene polymer was 3.25 dl/g and the MFR of pellets obtained by adding a prescribed amount of additives and granulating the mixture was 1.9 g/10 min.

The proportion of polypropylene obtained in the first stage polymerization in the multistage propylene polymer determined from the material balance was 85.7 wt %.

<Foam-Molded Products>

Example 8

Pellets for foaming were prepared by thoroughly blending 30 g of filler (porous silica "Mizukasil P-740T" manufactured by Mizusawa Industrial Chemicals, Ltd.), as a foamability promoting agent, and 3,000 g of multistage propylene polymer pellets prepared in Example 1 and granulating by extruding the mixture from a 20 mm φ short axis extruder manufactured by Toyo Seiki Seisaku-Sho, Ltd.

A foamed product was obtained by extruding the pellets from "J180EL-MuCell" manufactured by The Japan Steel Works, Ltd., under the conditions of a cylinder set temperature of 180° C., an amount of gas of 5 wt % (carbon dioxide), feeding pressure of 15 MPa, and injection time of 5 seconds.

The resulting small piece of foamed block was inspected by electron microscope to determine the average diameter of foam cells. The average diameter of foam cells was determined by averaging the diameter of cells that can be observed in a photograph (magnification: ×50, size of photograph: 10 cm×8 cm). As a result, the average foam cell diameter was 90 μm. The expansion ratio was 22 times.

In addition, the ratio of the storage modulus G' (10) at an angular frequency of 10 rad/s to the storage modulus G' (1) at an angular frequency of 1 rad/s, G' (10)/G' (1), was 3.89 and the ratio of the storage modulus G' (0.1) at an angular frequency of 0.1 rad/s to the storage modulus G' (0.01) at an angular frequency of 0.01 rad/s, G' (0.1)/G' (0.01), was 5.8.

Example 9

A foamed product was prepared and evaluated in the same manner as in Example 8 except that 15 g of a chemical foaming agent "EE205" manufactured by Eiwa Chemical Ind. Co., Ltd. was used instead of Mizukasil P-740T.

As a result, the average foam cell diameter of the resulting foamed product was 200 μm and the expansion ratio was 18 times. In addition, G' (10)/G' (1) was 3.83 and G' (0.1)/G' (0.01) was 5.66.

Example 10

A foamed product was prepared and evaluated in the same manner as in Example 8 except that 6 g of a crystallization nucleating agent "Gelall MD" manufactured by New Japan Chemical Co., Ltd. was used instead of Mizukasil P-740T.

As a result, the average foam cell diameter of the resulting foamed product was 120 μm and the expansion ratio was 20 times. In addition, G' (10)/G' (1) was 3.8 and G' (0.1)/G' (0.01) was 5.72.

Comparative Example 7

A foamed product was prepared and evaluated in the same manner as in Example 8 except that polypropylene pellets prepared in Example 1 were used alone without adding Mizukasil P-740T.

As a result, the average foam cell diameter of the resulting foamed product was 350 μm and the expansion ratio was 14 times. In addition, G' (10)/G' (1) was 3.85 and G' (0.1)/G' (0.01) was 5.75.

INDUSTRIAL APPLICABILITY

The molded product obtained by molding the composition containing the multistage polymer of the invention is suitably used in the fields of foamed sheets, building materials, and the like.

The invention claimed is:

1. A multistage propylene-based polymer comprising the following components (A) and (B):
   (A) 5 to 20 wt % of a propylene homopolymer component or a copolymer component of propylene and an α-olefin with 2 to 8 carbon atoms having an intrinsic viscosity [η] of 12 to 20 dL/g in tetralin at 135° C.; and
   (B) 80 to 95 wt % of a propylene homopolymer component or a copolymer component of propylene and an α-olefin with 2 to 8 carbon atoms having an intrinsic viscosity [η] of 0.5 to 3.0 dL/g in tetralin at 135° C.

2. The multistage propylene-based polymer according to claim 1 comprising 8 to 18 wt % of the (A) component and 82 to 92 wt % of the (B) component.

3. The multistage propylene-based polymer according to claim 1 of which the melt flow rate is 100 g/10 min or less at 230° C.,
   the melt flow rate (MFR) at 230° C. and the melt tension (MT) at 230° C. thereof satisfying the following relationship (1)

$$\log(MT) > -1.33 \log(MFR) + 1.2 \quad (1).$$

4. The multistage propylene-based polymer according to claim 1 wherein the ratio of the storage modulus G'(10) at an angular frequency of 10 rad/s to the storage modulus G'(1) at an angular frequency of 1 rad/s, G'(10)/G'(1), is 2 or more; and the ratio of the storage modulus G'(0.1) at an angular frequency of 0.1 rad/s to the storage modulus G'(0.01) at an angular frequency of 0.01 rad/s, G'(0.1)/G'(0.01), is 6 or less.

5. The multistage propylene-based polymer according to claim 1, comprising 10 to 16 wt % of the (A) component and 84 to 90 wt % of the (B) component.

6. The multistage propylene-based polymer according to claim 1, wherein the intrinsic viscosity [η] of component (A) is 13 to 18 dL/g and the intrinsic viscosity [η] of component (B) is 0.8 to 2.0 dL/g.

7. The multistage propylene-based polymer according to claim 6, wherein the intrinsic viscosity [η] of component (B) is 1.0 to 1.5 dL/g.

8. The multistage propylene-based polymer according to claim 1, wherein component (A) is a propylene homopolymer.

9. A method for producing the multistage propylene-based polymer of claim 1 comprising:
polymerizing propylene, or
copolymerizing propylene and an α-olefin with 2 to 8 carbon atoms
by using an olefin polymerization catalyst comprising the following components (a) and (b), or (a), (b), and (c) in 2 or more polymerization stages:
(a) a solid catalyst component prepared by treating titanium trichloride with an ether compound and an electron acceptor, the titanium trichloride prepared by reducing titanium tetrachloride with an organoaluminum compound;
(b) an organoaluminum compound; and
(c) a cyclic ester compound.

10. The method for producing the multistage propylene-based polymer of claim 9 comprising:
producing a propylene homopolymer component or a copolymer component of propylene and α-olefin with 2 to 8 carbon atoms having an intrinsic viscosity [η] of 12 to 20 dL/g in tetralin at 135° C. in an amount of 5 to 20 wt % of the polymer in the first polymerization stage, and
producing a propylene homopolymer component or a copolymer component of propylene and an α-olefin with 2 to 8 carbon atoms having an intrinsic viscosity [η] of 0.5 to 3.0 dL/g in tetralin at 135° C. in an amount of 80 to 95 wt % of the polymer in the second polymerization stage.

11. A propylene-based resin composition comprising:
the multistage propylene-based polymer of claim 1, and
a propylene-based polymer having a melt flow rate of 30 g/10 mm or less at 230° C. and a ratio of weight average molecular weight (Mw) to number average molecular weight (Mn) of 5 or less,
the weight ratio of the propylene-based polymer to the multistage propylene-based polymer being eight times or more.

12. The propylene-based resin composition according to claim 11, wherein the ratio of the storage modulus G'(10) at an angular frequency of 10 rad/s to the storage modulus G'(1) at an angular frequency of 1 rad/s, G'(10)/G'(1), is 5 or more; and
the ratio of the storage modulus G'(0.1) at an angular frequency of 0.1 rad/s to the storage modulus G'(0.01) at an angular frequency of 0.01 rad/s, G'(0.1)/G'(0.01), is 14 or less.

13. A propylene-based resin composition comprising the following component (1), and any one of the following components (2), (3), and (4):
(1) 100 parts by weight of the multistage propylene-based polymer of claim 1,
(2) 0.1 to 10 parts by weight of a powdery or fibrous porous filler,
(3) 0.05 to 1.0 parts by weight of a chemical foaming agent, and
(4) 0.05 to 1.0 parts by weight of a crystallization nucleating agent.

14. The propylene-based resin composition according to claim 13, wherein the porous filler is present and is silica, activated carbon, zeolite or silica gel having an average particle diameter of 50 μm or less, or fibrous activated carbon having a fiber diameter of 20 μm or less.

15. A foam product prepared by foam-molding the multistage propylene-based polymer of claim 1.

16. The foam product according to claim 15 which is an injection foam-molded product having an expansion ratio of 1.1 to 80 times, prepared by the process of injection foam-molding using a supercritical carbon dioxide or supercritical nitrogen.

17. The foam product according to claim 15 which is an extrusion foam-molded product having an expansion ratio of 1.1 to 80 times.

18. A foam product prepared by foam molding the propylene-based resin composition of claim 11.

19. A composite material comprising the multistage propylene-based polymer of claim 1, and at least one material selected from the group consisting of fibers, fillers and rubbers.

20. A composite material comprising the propylene-based resin of claim 11 and at least one material selected from the group consisting essentially of fibers, fillers and rubbers.

* * * * *